(12) United States Patent
Ganguli et al.

(10) Patent No.: US 10,201,792 B2
(45) Date of Patent: Feb. 12, 2019

(54) REACTORS AND REACTOR-INTERNAL DEVICES FOR DEHYDROGENATION OF HYDROCARBONS

(71) Applicant: SABIC Global Technologies B.V., Bergen op Zoom (NL)

(72) Inventors: Arijit Ganguli, Maharashtra (IN); Vinod S. Nair, Karnataka (IN); Ramsey Bunama, Riyahd (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/572,843

(22) PCT Filed: May 12, 2016

(86) PCT No.: PCT/IB2016/052743
§ 371 (c)(1),
(2) Date: Nov. 9, 2017

(87) PCT Pub. No.: WO2016/181344
PCT Pub. Date: Nov. 17, 2016

(65) Prior Publication Data
US 2018/0154324 A1 Jun. 7, 2018

Related U.S. Application Data

(60) Provisional application No. 62/161,394, filed on May 14, 2015.

(51) Int. Cl.
*B01J 4/00* (2006.01)
*B01J 8/02* (2006.01)

(52) U.S. Cl.
CPC .............. *B01J 8/0278* (2013.01); *B01J 4/005* (2013.01); *B01J 8/0242* (2013.01); *B01J 2208/0092* (2013.01); *B01J 2208/00938* (2013.01)

(58) Field of Classification Search
CPC ..... B01J 4/00; B01J 8/02; B01J 8/0242; B01J 8/0278; B01J 8/005; B01J 2208/0092; B01J 2208/00938
(Continued)

(56) References Cited

U.S. PATENT DOCUMENTS 3,685,971 A * 8/1972 Carson ................... B01D 3/008
239/558
4,743,433 A * 5/1988 Smith ................ B01D 19/0047
422/212
(Continued)

FOREIGN PATENT DOCUMENTS

| CN | 2865844 Y | 2/2007 |
| CN | 103071430 A | 5/2013 |

(Continued)

OTHER PUBLICATIONS

Chinese Patent No. 103071430; Date of Publication: May 1, 2013; Abstract Only, 1 page.
(Continued)

*Primary Examiner* — Huy Tram Nguyen
(74) *Attorney, Agent, or Firm* — Cantor Colburn LLP (57) ABSTRACT

A fixed bed reactor for cyclic, catalytic dehydrogenation of hydrocarbons, such as alkanes and a reactor-internal device for improving distribution of hydrocarbon feed into the fixed catalyst bed of the reactor. The device comprises a vertical deflector plate with multiple horizontal slits and a frustum cone with multiple perforations on the lateral surface, connected to the bottom end of the plate. The reactor includes a main horizontal reaction vessel containing a fixed catalyst bed and a cactus-shaped inlet assembly sub-divided into three inlets at the upper half portion to supply fluid streams, including hydrocarbon feed, to the catalyst bed. The distributor device is positioned inside a main central vertical arm of the inlet assembly form by the convergence of the (Continued)

three inlets. Various embodiments of the distributor device where the slit thicknesses, distance between slits, perforation diameter, distance between perforations are varied, are also provided.

20 Claims, 4 Drawing Sheets

(58) Field of Classification Search
USPC .......................................................... 422/211
See application file for complete search history.

(56) References Cited

U.S. PATENT DOCUMENTS

| | | | |
|---|---|---|---|
| 5,298,226 A | 3/1994 | Nowobilski | |
| 5,758,699 A * | 6/1998 | Haquet | B01J 8/002 |
| | | | 141/286 |
| 7,032,894 B2 | 4/2006 | Adusei et al. | |
| 7,066,973 B1 * | 6/2006 | Bentley | B01J 8/0465 |
| | | | 422/198 |
| 8,372,354 B2 | 2/2013 | Killen et al. | |
| 8,734,728 B2 | 5/2014 | Guo et al. | |
| 9,636,654 B2 * | 5/2017 | Oshinowo | B01J 19/0053 |
| 2010/0019061 A1 | 1/2010 | Kumar et al. | |
| 2011/0201856 A1 | 8/2011 | Cottard et al. | |
| 2012/0079938 A1 | 4/2012 | Celik et al. | |
| 2013/0221123 A1 | 8/2013 | Oshinowo et al. | |

FOREIGN PATENT DOCUMENTS

| | | |
|---|---|---|
| CN | 103071433 A | 5/2013 |
| CN | 203183985 U | 9/2013 |
| CN | 203507981 U | 4/2014 |
| CN | 203737214 U | 7/2014 |
| EP | 0303439 A2 | 2/1989 |
| EP | 2075056 A1 | 7/2009 |

OTHER PUBLICATIONS

Chinese Patent No. 103071433; Date of Publication: May 1, 2013; Abstract Only; 2 pages.
Chinese Patent No. 203183985; Date of Publication: Sep. 11, 2013; Abstract Only; 1 page.
Chinese Patent No. 203507981; Date of Publication: Apr. 2, 2014; Abstract Only; 1 page.
Chinese Patent No. 203737214; Date of Publication: Jul. 30, 2014; Abstract Only; 1 Page.
Chinese Patent No. 2865844; Date of Publication: Feb. 7, 2007; Abstract Only, 1 page.
International Search Report for International Application No. PCT/IB2016/052743; Dated: Jul. 26, 2016; 5 pages.
Seo, S. et al, "Repetitive control of CATOFIN process", Korean Journal of Chemical Engineering, 2007, vol. 24, No. 6, pp. 921-926.
Written Opinion of the International Search Report for International Application No. PCT/IB2016/052743; Dated: Jul. 26, 2016; 5 pages.

* cited by examiner

REACTORS AND REACTOR-INTERNAL DEVICES FOR DEHYDROGENATION OF HYDROCARBONS

CROSS REFERENCE TO RELATED APPLICATIONS

This application is a 371 of International Application No. PCT/M2016/052743, filed May 12, 2016, which claims priority to U.S. Application No. 62/161,394 filed May 14, 2015, both of which are incorporated herein by reference in their entirety.

TECHNICAL FIELD

Disclosed herein are reactors for dehydrogenation of hydrocarbons, for example, horizontal, fixed-bed reactors for dehydrogenation of hydrocarbons and devices placed inside the reactors to enhance distribution of the hydrocarbon feed.

BACKGROUND

The ""background"" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The dehydrogenation of hydrocarbons, involves the breaking of two carbon-hydrogen (C—H) bonds with the simultaneous formation of a hydrogen molecule ($H_2$) and a molecule containing a double carbon-carbon bond (C=C). The double bond is a highly reactive point that permits the use of double bond-containing molecules as intermediates for the production of typical petrochemical products such as polymers. Dehydrogenation reactions that are of significant industrial interest include dehydrogenation of low paraffins ($C_2$-$C_5$ alkanes) to produce corresponding olefins or alkenes, dehydrogenation of $C_{10}$-$C_{15}$ linear paraffins to yield linear-alkyl-benzenes and ethyl benzenes that provide starting points for the production of polystyrene plastics.

Dehydrogenation of alkanes to olefins can generally be classified as either oxidative or non-oxidative reactions. Disadvantages associated with oxidative dehydrogenation include high exothermicity and low desired product selectivity and quality. Non-oxidative processes (i.e., direct dehydrogenation or catalytic dehydrogenation) can suffer from the requirement of a continuous heat supply to initiate the endothermic reaction. The temperatures that are required to shift the equilibria favorably to alkene products during direct dehydrogenation can promote rapid deactivation of the catalyst by coking, resulting in the need for frequent catalyst regeneration. These high temperatures can also lead to thermal cracking of the alkanes, which can lead to undesirable non-selective side reactions that result in formation of byproducts.

Dehydrogenation reactions may appear simplistic; their thermodynamic and kinetic characteristics have, nevertheless, contributed to make the development of technologies that allow for a reliable and efficient industrial application, rather complex. Presently, CATOFIN™, Oleflex, STAR and FBH (Fluidized Bed Dehydrogenation) are technologies used industrially to dehydrogenate propane, n-butane, isobutane and isopentane to the corresponding monolefins.

The CATOFIN™ process uses multiple horizontal reactors that are each equipped with a fixed catalyst bed. The CATOFIN™ process includes three main steps: preheating, catalytic dehydrogenation and regeneration of the catalyst (decoking). The dehydrogenation and the regeneration are cyclic, and are designed to run adiabatically with the catalyst on hydrocarbon feed for very short cycles, followed by the regeneration. A key principal of the process is that the consumption of heat during the endothermic dehydrogenation reaction is closely in balance with the heat restored to the bed during the regeneration cycles. In recent years, the CATOFIN™ process has emerged as a competitive production process for propylene and isobutylene due to its higher product selectivity, energy efficiency and low operating cost with the advance of the catalyst.

In any reaction involving a solid catalyst bed, uniform distribution of fluids and uniform fluid flow are crucial to achieving high process efficiency. The state of the art addresses mostly vertical reactors with two phase charge in downward flow.

U.S. Pat. No. 8,734,728 discloses the design of a gas distributor with ring sparger for an ammonia oxidizer (a vertical reactor). The feed inlet is from the center and the oxidizer is a vertical vessel with a catalyst bed. The bed velocities are uniform and are lowered by the distributor, which is designed with computational fluid dynamics (CFD).

U.S. Patent Application Publication 2012/0079938 discloses a radial flow distributor design for a vertical reactor. The ratio of mass flow rates of process gas is kept proportional to the flow areas of flow channels.

U.S. Pat. No. 8,372,354 describes devices and a system that improves fluid mixing and distribution to the underlying catalyst bed of a vertical reactor. The devices and system also offer other advantages such as decreased mixing tray height, easier maintenance, assembly and disassembly.

U.S. Patent Application Publication 2013/0221123 discloses a reactor inlet distributor and a perforated deflector for a vertical reactor. A relation between the diameter of the perforated distributor, the height of the opening of the inlet distributor pipe of the reactor inlet distributor and the outer diameter of the inlet distributor pipe is given.

U.S. Pat. No. 7,032,894 discloses a device for distributing a gas into a monolith bed of a vertical reactor. The distributor consists of a plurality of flow channels stacked in order of decreasing diameter. The flow channels successively split a flow stream into multiple flow streams prior to flow streams entering the monolith bed.

European Patent Application 2075056 discloses a distributor nozzle for a two phase charge to be used in fixed bed reactors, with the aim of increasing the area over which the mixture is dispersed and making its flow rate equal over the whole area of the bed in the reactor.

U.S. Pat. No. 5,298,226 discloses a perforated plate fluid distributor device that provides uniform gas flow in pressure swing, fixed adsorbent bed vessels.

All of the aforementioned references are incorporated by reference in their entireties.

Reactions of fluid starting materials with a fluid oxidant stream over a fixed-bed catalyst are usually carried, out in upright reactors in which the solid catalysts are present as catalyst beds through which the reactants flow axially or radially. In the CATOFIN™ process, the introduction and mixing-in of the hydrocarbon feed, air and steam, generally has to be effected very uniformly over the entire entry area into the catalyst upstream of the catalyst beds, with very little inhomogeneity of the mixture and within a very short"

time, frequently less than 0.1 seconds, in order to suppress secondary reactions such as flame formation, cracking, soot formation, etc.

These requirements are virtually impossible to realize in the case of vertical axial reactors and can be realized only with great difficulty in radial reactors. Hence, horizontal fixed-bed reactors, i.e. reactors having a horizontal longitudinal axis and generally a cylindrical shape, are better suited to meeting the above requirements of the CATOFIN™ process.

Thus, what is needed is a horizontal reactor and a device placed inside the reactor and/or a reactor feed line or feed port that improve the distribution of hydrocarbon feed over the catalyst bed for CATOFIN™ processes.

BRIEF SUMMARY

Disclosed, in various embodiments, are devices for distributing one or more fluid streams evenly into a catalyst bed, fluid bed reactor, and methods of making thereof.

A device for distributing one or more fluid streams evenly into a catalyst bed comprises: a vertical deflector plate having a top end, a bottom end and a vertical span, the vertical span comprising a plurality of horizontal slits along the vertical span length; and a frustum cone connected to the bottom end, the frustum cone having an angled, lateral surface comprising a plurality of perforations arranged in rows having a triangular pitch.

A fixed bed reactor system, comprises: a horizontal vessel comprising an elongated, fixed catalyst bed positioned inside the horizontal vessel laterally along the length of the horizontal vessel; an inlet assembly connected to a central top portion of the horizontal vessel, the inlet assembly having an upper half portion and a lower half portion, the upper half portion comprising first, second and third inlets wherein the first inlet and the second inlet are inclined with respect to the vertical axis of the inlet assembly, the first, the second and the third inlets converging to form the lower half portion comprising a central arm; and a feed distributor contained inside the central arm downstream of the first, the second and the third inlets and upstream of the fixed catalyst bed, the feed distributor comprising a deflector plate and a frustum cone, the deflector plate having a top end, a bottom end and a vertical span, the vertical span comprising a plurality of horizontal slits along the vertical span length, the frustum cone connected to the bottom end and having an angled, lateral surface comprising a plurality of perforations arranged in rows with triangular pitch.

These and other features and characteristics are more particularly described below.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings. The accompanying drawings have not necessarily been drawn to scale. Any values and dimensions illustrated in any accompanying graphs and figures are for illustration purposes only and may or may not represent actual or preferred values or dimensions. Where applicable, some or all features may not be illustrated to assist in the description of the underlying features. In the drawings.

DETAILED DESCRIPTION

According to a first aspect, the disclosed herein is a device for distributing one or more fluid streams evenly into a catalyst bed. The device comprises a vertical deflector plate having a top end, a bottom end and a vertical span, the vertical span comprising a plurality of horizontal slits along the vertical span length and a frustum cone connected to the bottom end, the frustum cone having an angled, lateral surface comprising a plurality of perforations arranged in rows with triangular pitches between the perforations.

In one or more embodiments, the horizontal slits are parallel to one another.

In one or more embodiments, the horizontal slits on the vertical deflector plate have equal or varying thicknesses of 20-120 millimeters (mm).

In one or more embodiments, the horizontal slits on the vertical deflector plate have equal or varying distances between one another of 0.1-0.5 meters (m).

In one or more embodiments, the perforations on the angled, lateral surface of the frustum cone have equal or varying diameters of 0.25-2.0 centimeters (cm).

In one or more embodiments, the perforations on the angled, lateral surface of the frustum cone have equal or varying distances between one another of 1.0-20.0 cm.

In one or more embodiments, the triangular pitches of the perforations have equal or varying lengths.

According to a second aspect, disclosed herein is a fixed bed reactor system. The reactor system comprises a horizontal vessel comprising an elongated, fixed catalyst bed positioned in the center of the horizontal vessel across the lateral length of the horizontal vessel, an inlet assembly connected to a central top portion of the horizontal vessel, the inlet assembly having an upper half portion and a lower half portion, the upper half portion comprising first, second and third inlets wherein the first inlet and the second inlet and inclined with respect to the vertical axis of the inlet assembly on opposing left and right sides, the first, the second and the third inlets converging to form the lower half portion comprising a central vertical arm and a feed distributor contained inside the central vertical arm downstream of the first, the second and the third inlets and upstream of the fixed catalyst bed, the feed distributor comprising a vertical deflector plate and a frustum cone, the vertical deflector having a top end, a bottom end and a vertical span, the vertical span comprising a plurality of horizontal slits along the vertical span length, the frustum cone connected to the bottom end and having a curved, lateral surface comprising a plurality of perforations arranged in rows with triangular pitches between the perforations. The inlet assembly of the reactor system is configured to transport one or more fluid streams downwardly to the fixed catalyst bed. The feed distributor is configured to distribute the one or more fluid streams evenly into the fixed catalyst bed.

In one or more embodiments, the horizontal slits are parallel to one another.

In one or more embodiments, the frustum cone further comprises a base edge that aligns with the central top portion of the horizontal vessel.

In one or more embodiments, the feed distributor has a height that is at least half of the height of the inlet assembly.

In one or more embodiments, the fixed catalyst bed in the reactor system comprises a catalyst selected from a chromia-alumina catalyst, a chromium-based catalyst, a silica-based catalyst, a zirconia-based catalyst, an alumina-based catalyst, a zeolite-based catalyst, or a catalyst suitable for catalyzing dehydrogenation of hydrocarbons, or a combination comprising at least one of the foregoing.

In one or more embodiments, the horizontal vessel further comprises one or more outlets for emission of reaction products.

In one or more embodiments, the horizontal vessel further comprises one or more distributor trays above the fixed catalyst bed and below the feed distributor.

In one or more embodiments, the horizontal slits on the vertical deflector plate have equal or varying thicknesses of 20-120 mm.

In one or more embodiments, the horizontal slits on the vertical deflector plate have equal or varying distances between one another of 0.1-0.5 m.

In one or more embodiments, the perforations on the angled, lateral surface of the frustum cone have equal or varying diameters of 0.1-2.0 cm.

In one or more embodiments, the perforations on the angled, lateral surface of the frustum cone have equal or varying distances between one another of 0.5-20.0 cm.

In one or more embodiments, the triangular pitches of the perforations have equal or varying lengths.

According to a third aspect, the present invention provides a method of producing an olefin by dehydrogenation of a corresponding alkane. The method comprises contacting the corresponding alkane with the fixed bed reactor system according to the second aspect of the invention. The alkane is contacted with the fixed catalyst bed at a temperature of 600-650° C.

In one or more embodiments, the one or more fluid streams comprise at least a hydrocarbon feed stream.

In one or more embodiments, the hydrocarbon feed stream is selected from a propane stream, an n-butane stream, an isobutane stream, an isopentane stream, or a combination comprising at least one of the foregoing.

The present invention provides a reactor for cyclic, non-oxidative dehydrogenation of hydrocarbons and a device placed inside the reactor that improves the distribution of hydrocarbon feed so that the overall process efficiency can be enhanced.

Figure 1:
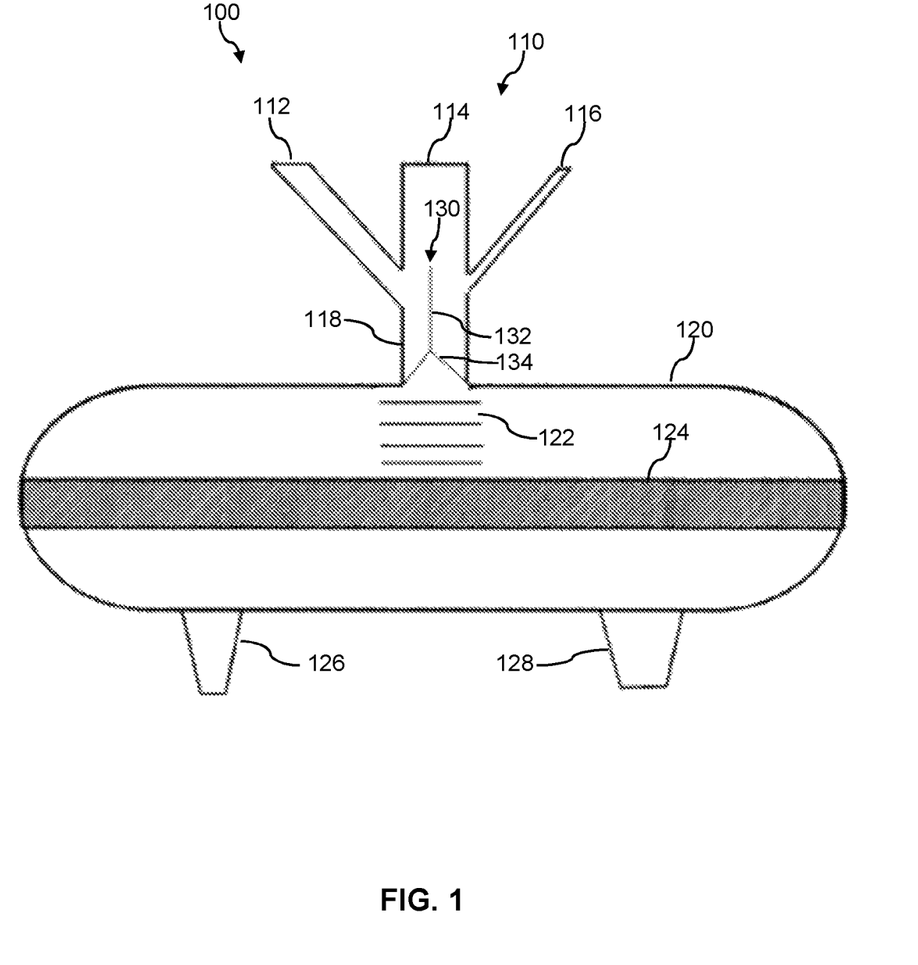
FIG. 1 is a schematic diagram of a CATOFIN™ horizontal fixed bed reactor system including at least a cactus inlet assembly containing a pre-distributor, a horizontal vessel containing a catalyst bed.

In FIG. 1, a schematic diagram of a reactor system 100 for the cyclic, non-oxidative hydrocarbon dehydrogenation process, for example, the CATOFIN™ process, is shown. The reactor system 100 includes a horizontal vessel 120 and a cactus inlet assembly 110 that is connected to a central top portion of the horizontal vessel 120. In certain embodiments, more than one cactus inlet assembly 110 can be connected to the horizontal vessel 120. The horizontal vessel 120 includes an elongated, fixed catalyst bed 124 that is positioned in the center of the vessel across the lateral length of the horizontal vessel 120. In certain embodiments, the horizontal vessel 120 can include more than one fixed catalyst bed 124. In one or more embodiments, a distributor region 122 which includes a plurality of distributor trays disposed above the fixed catalyst bed 124, for example, 0.1-0.5 m above, for example, 0.1-0.25 m above, where the cactus inlet assembly 110 meets the horizontal vessel 120. The length of the plurality of distributor trays is proportional to the diameter of the hydrocarbon inlet 112, and can be at least 2 times, for example, 4 to 10 times the diameter of the hydrocarbon inlet 112. In certain embodiments, the horizontal vessel 120 can further include a hydrocarbon outlet 126 (e.g., for emission the olefin products) and an air outlet 128. Although illustrated at the bottom of the horizontal vessel 120, it is to be understood that the hydrocarbon outlet 126 and air outlet 128 can be located along any position of the horizontal vessel 120.

For purposes of the present disclosure, the CATOFIN™ process refers to a fixed-bed, cyclic process in which light paraffins including $C_2$-$C_5$ alkanes such as propane, n-butane, isobutane and isopentane, are catalytic dehydrogenated into corresponding olefins, e.g., propylene, butadiene, isobutylene and isoprene, respectively. The dehydrogenation of the feedstock material and the regeneration of the catalyst (i.e., decoking) take place in a cyclic or repetitive manner, which are both designed to run adiabatically, with the catalyst on hydrocarbon feed for very short cycles, for example, 7-15 minutes, for example, 2-25 min, for example, 5-20 min, for example, 8-10 min), followed by regeneration of the catalyst for a similar period of time. The consumption of heat during the endothermic dehydrogenation reaction is closely in balance with the heat restored to the bed during the regeneration cycles. Hot air flow and combustion of coke are two main sources of heat input to the catalyst bed. Due to these requirements and others previously outlined, a reactor with a horizontal design is better suited for the CATOFIN™ process.

During operation, the horizontal vessel 120 cycles between the dehydrogenation step and the regeneration step. Multiple reactors can be used to maintain a continuous product flow with a cycle length of 10-60 minutes, for example, 20-30 minutes.

In certain embodiments, the catalyst packed in the fixed catalyst bed 124 can include a CATOFIN™ catalyst (chromia-alumina), a chromium-based catalyst, a silica-based catalyst, a zirconia-based catalyst, an alumina-based catalyst, a zeolite-based catalyst or combinations thereof. For example, but not by way of limitation, the catalyst can be suitable for catalyzing dehydrogenation reactions of alkanes and/or CATOFIN™ processes. In certain embodiments, the catalyst is a catalyst that can be regenerated using steam. In some embodiments, the fixed catalyst bed 124 can include multiple layers (for example, 3-12, for 5-10) of different catalytic materials or different compositions of catalytic material.

Still referring to FIG. 1, the cactus inlet assembly 110 facilitates entry of three different fluid streams, namely hydrocarbon feed, air and steam into the horizontal vessel 120 through a hydrocarbon inlet 112, an air inlet 114 and a steam inlet 116, respectively. In certain embodiments, especially for oxydehydrogenation reactions, the air stream can be enriched with oxygen, for example supplying a molar ratio of between 0.08 and 0.16 with respect to every mole of the hydrocarbon feed. In some embodiments, the air stream can consist essentially of oxygen, for example at least 90 mole percent (mol. %) pure oxygen. For non-oxidative dehydrogenation reactions, the air stream composition can be 16-21 mol. % oxygen and 19-84 mol. % nitrogen.

As shown in FIG. 1, the upper half portion of the cactus inlet assembly 110 is sub-divided into the hydrocarbon inlet, 112, the air inlet 114 and the steam 116. The hydrocarbon inlet 112 and the steam inlet 116 are inclined and on opposing left and right sides, flanking the air inlet 114, therefore imparting the cactus shape of the inlet assembly. In alternate embodiments the inlet 112 and the steam inlet 116 are inclined and oriented radially around the air inlet 114, at angles of, for example, 150°, 125°, 90°, 45° with respect to one another. The three inlets 112, 114 and 116 converge to form a central arm 118 which can be vertical or inclined, which is cylindrical, at the lower portion of the cactus inlet assembly. The hydrocarbon inlet 112 and the steam inlet 116 are inclined with respect to the vertical axis of the central vertical arm 118.

During the dehydrogenation cycle of a standard operation, a hydrocarbon feed enters the reactor system 100 through the hydrocarbon inlet 112 to be contacted with the fixed catalyst bed 124. However, in conventional processes, due to the inclination of the hydrocarbon inlet 112, the hydrocarbon feed can get channelized toward the opposite side of the central vertical arm 118. This phenomenon is known as "bypassing", and is dependent on the temperature at which the feed is charged into the reactor system. The thermodynamics of dehydrogenation require operation at a relatively high temperature of up to 700° C., for example, 600-700° C., for example, 600-650° C. and as such, increases the likelihood of the feed stream being bypassed. The bypassing leads to a poor distribution of the feed in the fixed catalyst bed 124, thereby reducing the efficiency the dehydrogenation reaction.

Figure 2:
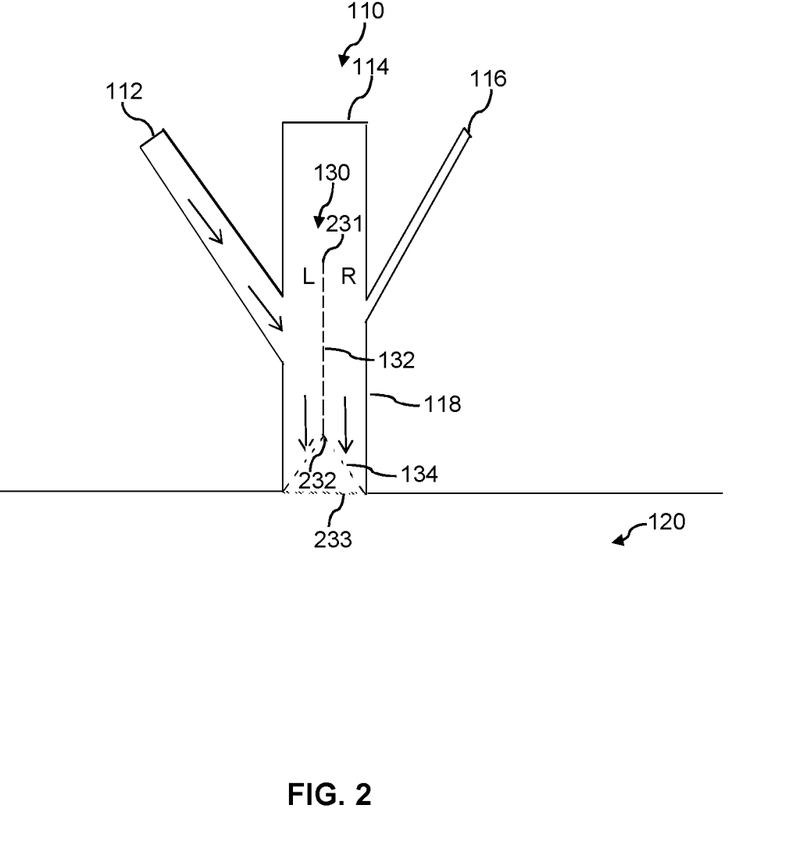
FIG. 2 illustrates the positioning of the pre-distributor inside the cactus inlet assembly and the flow of the hydrocarbon feed stream according to one embodiment.

To prevent the mal-distribution of feed, the device and/or reactor system of the present disclosure further include a device 130 in the reactor system 100 that allows the pre-distribution of the hydrocarbon feed. As shown in FIGS. 1 and 2, the device 130 is installed at the central vertical arm 118, downstream of the hydrocarbon inlet 112 and upstream of the distributor region 122 that contains multiple distributor trays. With the existing reactor design (i.e. reactor without the device 130), the distribution is good for air and steam. Using the modified reactor design (i.e. reactor with the device 130 installed, the distribution of hydrocarbon, steam and air is improved.

The device 130 includes two parts: a vertical deflector plate 132 having a top end 231 and a bottom end 232 and a frustum cone 134 connected to the bottom end 232.

In one or more embodiments, the device 130 or at least a portion thereof is constructed of a metallic material.

Advantageously, as shown in FIG. 2, the device 130 is positioned such that base edge 233, which is circular in an embodiment but can alternately be rectangular, oblong, or have other shapes, aligns the central top portion of the horizontal vessel 120 where the cactus inlet assembly 110 meets the horizontal vessel 120. The device 130 can be connected or joined to the inner wall of the central vertical arm 118 (which is cylindrical), for example, by way of welding.

Also advantageously, the height of the device 130 is at least, preferably greater than, half the height of the cactus inlet assembly 110, so that the vertical deflector plate 132 would be high enough to partially deflect the hydrocarbon stream (e.g., 30-70 vol. % of the hydrocarbon stream, for example, 40-60%, for example, 45-55%) as soon as the stream enters the reactor system from the hydrocarbon inlet 112. For example, when the given height of the cactus inlet assembly is 6.0-7.0 m, the corresponding height of the device 130 is at least 3.0-3.5 m. In one commercial example, the cactus inlet assembly has a height of 6.69 m. Therefore, the height of the device 130 is preferably at least 3.35 m.

Figure 3:
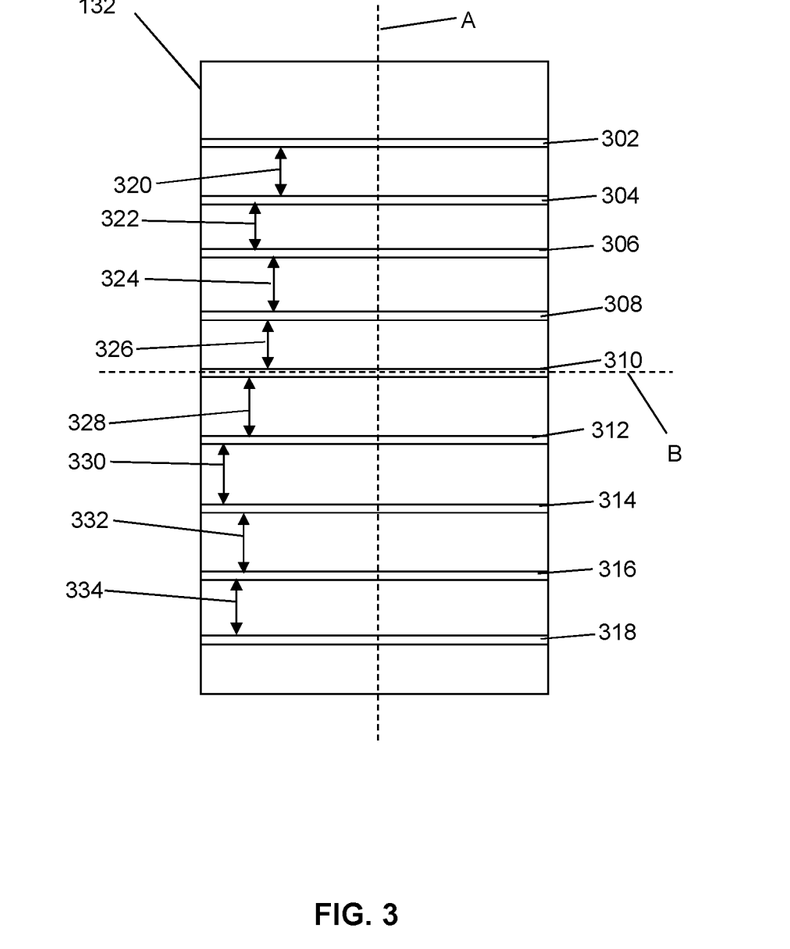
FIG. 3 is an exploded side view of the vertical deflector plate of the pre-distributor according to one embodiment, showing the plurality of horizontal slits.

A portion of the hydrocarbon stream is allowed to sieve through a series of horizontal slits on the vertical deflector plate 132 in order to first achieve a uniform distribution and a uniform flow of the feed stream in the central vertical arm 118, which ultimately results in a uniform distribution and a uniform flow of the feed in the fixed catalyst bed 124. FIG. 3 provides a side view of the vertical deflector plate 132, with axis-A and axis-B representing the vertical axis and the horizontal axis of the plate, respectively. As shown in FIG. 3, the vertical deflector plate 132 includes a series of slits that are preferably substantially horizontal (302-318, in this example) that run parallel to one another and to axis-B, along a portion of the span length of the plate or the entire vertical span length of the plate. Referring to FIG. 2 again, the plurality of horizontal slits on the vertical deflector plate 132 help to partially deflect and distribute the hydrocarbon feed stream (indicated by straight arrows) evenly between left (L) and right (R) portions of the central vertical arm 118 as divided by the vertical deflector plate 132.

The number of horizontal slits can be at least 5, for example, at least 7, for example, 10-100. The slits can be evenly spaced vertically along the plate and can extend across a portion of the width of the plate, for example, the slits can extend at least 50%, at least 70%, or at least 90% across the width of the plate.

In one embodiment, the horizontal slits have equal thicknesses. In another embodiment, the horizontal slits have varying thicknesses. The thickness can be 20-120 mm, for example, 30-110 mm, for example, 35-100 mm. As described herein, thickness describes the width of the slit along its length wise axis.

In one embodiment, the horizontal slits have equal distances (320-334 in the example shown in FIG. 3) between one another of, for example, 0.1-0.5 m, for example, 0.2-0.4 m, for example, 0.25-0.35 m.

In another embodiment, the horizontal slits have varying distances between one another with the same distance ranges as previously described.

In certain embodiments, the horizontal slits on the vertical deflector plate 132 can be louvered and spaced either evenly or unevenly according to the distance ranges described above. The louver angle, measured against vertical axis-A, can be 5-45°, for example, 5-30°, for example, 5-15°.

Figure 4:
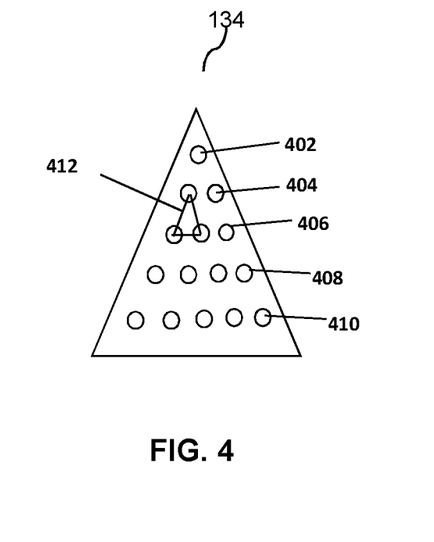
FIG. 4 is an exploded view of the frustum cone of the pre-distributor according to one embodiment, showing rows of perforations on the lateral surface of the frustum cone.

The frustum cone 134 can be substantially void and can include multiple rows of perforations on the angled, lateral surface of the cone, as shown in FIG. 4. The pitch 412 of the perforations 402-410 can be triangular, as indicated in FIG. 4. The number of perforation rows can be 2-20, for example, 5-15, for example, 5-10. The number of perforations in a row increases from top to bottom of the cone, owing to the inherent properties of the geometrical shape of the cone.

The diameters of the circular perforations can be 0.25-2.0 cm, for example, 0.25-1.0 cm, for example, 0.25-0.5 cm.

The distances between perforations (intra- and inter-row) can be 1.0-20.0 cm, for example, 3.0-15.0 cm, for example, 2.0-12.0 cm.

In one embodiment, the diameters of the perforations, distances between perforations and the pitches can be held constant.

In another embodiment, the diameters and distances between perforations can be varied according to the values disclosed herein, but the pitches can be held constant.

In yet another embodiment, the diameters and distances between perforations can be varied according to the values disclosed herein, thereby also varying the pitches.

The angle of the frustum cone 134, measured between the height and the slant of the cone at the vertex, is dependent on the velocity of the feed stream entering the reactor system through the hydrocarbon inlet. In an embodiment, the angle of the frustum cone 134 is calculated using computational fluid dynamics (CFD). In certain embodiments, the cone angle is 5-75°, for example, 10-70°, for example, 15-60°. These angles can correspond to feed velocities of 1000-3000 kilograms per minute (kg/min), 1250-2750 kg/min, or 1500-2500 kg/min, respectively.

The following examples are merely illustrative of the devices, fixed bed reactor systems, and methods of producing an olefin disclosed herein and are not intended to limit the scope hereof.

EXAMPLES

Example 1

As shown in Table 1, in one or more embodiments, the device 130 is effective in reducing the pressure drop from the hydrocarbon inlet 112 to the horizontal vessel 120. In an embodiment shown in Table 1, the pressure was reduced by no more than 0.1-5%, for example, 0.5-1.0% compared to a reactor without the device. How rate was measured in kilograms per hour (kg/h), pressure drop was measured in Pascals (Pa), and operating pressure was measured in Pascals.

TABLE 1

Pressure drop across from hydrocarbon feed inlet to horizontal vessel

| Reactor design | Flow rate (kg/h) | Pressure drop (Pa) | Operating pressure (Pa) |
| --- | --- | --- | --- |
| Without pre-distributor | 160,000 | 60,147 | 101,325 |
| With pre-distributor | 160,000 | 59,651 | 101,325 |

Example 2

In one or more embodiments, the fixed catalyst bed 124 comprises several layers of packed catalytic material or catalyst particles as described herein. In the example shown in Tables 2 and 3 below, the catalyst bed can be divided into seven layers and the area weighted bed velocity for each layer has been measured. Table 2 compares the velocities for each layer of the catalyst bed between a reactor without the pre-distributor device 130 and the same reactor with the pre-distributor device installed. In the latter reactor design (with the pre-distributor device), the bed velocities of each catalyst bed layer, especially from the third layer onward, are more stable and consistent. In Table 3, all reactors in cases 1-4 have the pre-distributor device installed within, but the thickness of the horizontal slits is varied: 100 mm, 75 mm, 50 mm and 35 mm Velocity was measured in meters per second (m/s).

TABLE 2

Area weighted bed velocities comparison of reactors with and without pre-distributor device

| Reactor design | Layer average bed velocities (m/s) | | | | | | |
| --- | --- | --- | --- | --- | --- | --- | --- |
| | 1 | 2 | 3 | 4 | 5 | 6 | 7 |
| Without pre-distributor | 1 | 1 | 0.7 | 0.65 | 0.42 | 0.2 | 0.93 |
| With pre-distributor | 1 | 1 | 0.61 | 0.61 | 0.61 | 0.61 | 0.74 |

TABLE 3

Area weighted bed velocities for each layer with varying horizontal slit thickness

| Case Number | Thickness (mm) | Layer average bed velocities (m/s) | | | | | | |
| --- | --- | --- | --- | --- | --- | --- | --- | --- |
| | | 1 | 2 | 3 | 4 | 5 | 6 | 7 |
| 1 | 100 | 1 | 1 | 0.61 | 0.61 | 0.61 | 0.61 | 0.85 |
| 2 | 75 | 1.56 | 1.62 | 1.1 | 0.95 | 0.67 | 0.7 | 0.91 |
| 3 | 50 | 1.2 | 1.06 | 0.66 | 0.66 | 0.66 | 0.66 | 1.2 |
| 4 | 35 | 1.1 | 0.7 | 0.56 | 0.56 | 0.56 | 0.56 | 1.28 |

In an alternative embodiment, multiple vertical deflector plates (e.g., 2-4) can be connected to the frustum cone 134. The multiple vertical deflector plates can be oriented radially to form a triangle or a rectangle at the port of the hydrocarbon inlet 112.

The devices for distributing one or more fluid streams evenly into a catalyst bed, fluid bed reactor, and methods of making thereof disclosed herein include at least the following embodiments:

Embodiment 1

A device for distributing one or more fluid streams evenly into a catalyst bed comprising: a vertical deflector plate having a top end, a bottom end and a vertical span, the vertical span comprising a plurality of horizontal slits along the vertical span length; and a frustum cone connected to the bottom end, the frustum cone having an angled, lateral surface comprising a plurality of perforations arranged in rows having a triangular pitch.

Embodiment 2

The device of Embodiment 1, wherein the horizontal slits are parallel to one another.

Embodiment 3

The device of Embodiment 1 or Embodiment 2, wherein the horizontal slits have equal or varying thicknesses of 20-120 millimeters.

Embodiment 4

The device of any of Embodiments 1-3, wherein the horizontal slits have equal or varying distances between one another of 0.1-0.5 meters.

Embodiment 5

The device of any of Embodiments 1-4, wherein the perforations have equal or varying diameters of 0.1-2.0 centimeters.

Embodiment 6

The device of any of Embodiments 1-5, wherein the perforations have equal or varying distances between one another of 0.5-20.0 centimeters.

Embodiment 7

The device of any of Embodiments 1-6, wherein the perforations have triangular pitch of equal or varying lengths.

Embodiment 8

A fixed bed reactor system, comprising: a horizontal vessel comprising an elongated, fixed catalyst bed positioned inside the horizontal vessel laterally along the length of the horizontal vessel; an inlet assembly connected to a central top portion of the horizontal vessel, the inlet assembly having an upper half portion and a lower half portion, the upper half portion comprising first, second and third inlets wherein the first inlet and the second inlet are inclined with respect to the vertical axis of the inlet assembly, the first, the second and the third inlets converging to form the lower half portion comprising a central arm; and a feed distributor contained inside the central arm downstream of the first, the second and the third inlets and upstream of the fixed catalyst bed, the feed distributor comprising a deflector plate and a frustum cone, the deflector plate having a top end, a bottom end and a vertical span, the vertical span comprising a plurality of horizontal slits along the vertical span length, the frustum cone connected to the bottom end and having an angled, lateral surface comprising a plurality of perforations arranged in rows with triangular pitch.

Embodiment 9

The fixed bed reactor system of Embodiment 8, wherein the horizontal slits are parallel to one another.

Embodiment 10

The fixed bed reactor system of Embodiment 8 or Embodiment 9, wherein the frustum cone further comprises a base edge that aligns with the central top portion of the horizontal vessel.

Embodiment 11

The fixed bed reactor system of any of Embodiments 8-10, wherein the feed distributor has a height that is at least half of the height of the inlet assembly.

Embodiment 12

The fixed bed reactor system of any of Embodiments 8-11, wherein the fixed catalyst bed comprises a catalyst selected from the group consisting of a chromia-alumina catalyst, a chromium-based catalyst, a silica-based catalyst, a zirconia-based catalyst, an alumina-based catalyst, a zeolite-based catalyst and a catalyst suitable for catalyzing dehydrogenation of hydrocarbons.

Embodiment 13

The fixed bed reactor system of any of Embodiments 8-12, wherein the horizontal vessel further comprises one or more outlets for emission of reaction products.

Embodiment 14

The fixed bed reactor system of any of Embodiments 8-13, wherein the horizontal vessel further comprises one or more distributor trays above the fixed catalyst bed and below the feed distributor.

Embodiment 15

The fixed bed reactor system of any of Embodiments 8-14, wherein the horizontal slits have equal or varying thicknesses of 20-120 millimeters.

Embodiment 16

The fixed bed reactor system of any of Embodiments 8-15, wherein the horizontal slits have equal or varying distances between one another of 0.1-0.5 meters.

Embodiment 17

The fixed bed reactor system of any of Embodiments 8-16, wherein the perforations have equal or varying diameters of 0.25-2.0 centimeters.

Embodiment 18

The fixed bed reactor system of any of Embodiments 8-17, wherein the perforations have equal or varying distances between one another of 1.0-20.0 centimeters.

Embodiment 19

The fixed bed reactor system of any of Embodiments 8-18, wherein the triangular pitches have equal or varying lengths.

Embodiment 20

A method of producing an olefin by dehydrogenation of a corresponding alkane, comprising: contacting the corresponding alkane with the fixed bed reactor system of any of Embodiments 1-7; wherein the alkane is contacted with the fixed catalyst bed at a temperature of 600-650° C.

Embodiment 21

The method of Embodiment 20, wherein the one or more fluid streams comprise a hydrocarbon feed stream.

Embodiment 22

The method of Embodiment 20 or Embodiment 21, wherein the hydrocarbon feed stream is selected from a propane stream, an n-butane stream, an isobutane stream, an isopentane stream, or a combination comprising at least one of the foregoing.

Referring now to the drawings, wherein like reference numerals designate identical or corresponding parts throughout the several views.

Reference through the specification to "one embodiment" or "an embodiment" means that a particular feature, structure, or characteristic described in connection with an embodiment is included in an embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Additionally, it must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Further, it is intended that the present invention and embodiments thereof cover the modifications and variations. For example, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit the present invention to any particular orientation or configuration. Furthermore, terms such as "first," "second," "third," etc., merely identify one of a number of portions, components and/or points of reference as disclosed herein, and likewise do not necessarily limit the present invention to any particular configuration or orientation.

Thus, the foregoing discussion discloses and describes merely exemplary embodiments of the present invention. As will be understood by those skilled in the art, the present invention may be embodied in other specific forms without departing from the spirit intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A device for distributing one or more fluid streams evenly into a catalyst bed comprising:
   a vertical deflector plate having a top end, a bottom end and a vertical span, the vertical span comprising a plurality of horizontal slits along the vertical span length; and
   a frustum cone connected to the bottom end, the frustum cone having an angled, lateral surface comprising a plurality of perforations arranged in rows having a triangular pitch.

2. The device of claim 1, wherein the horizontal slits are parallel to one another.

3. The device of claim 1, wherein the horizontal slits have equal or varying thicknesses of 0.1-0.5 meters.

4. The device of claim 1, wherein the perforations have equal or varying diameters of 0.5-20.0 centimeters.

5. The device of claim 1, wherein the perforations have triangular pitch of equal or varying lengths.

6. The device of claim 1, wherein the horizontal slits have equal or varying distances between one another of 20-120 millimeters.

7. The device of claim 1, wherein the perforations have equal or varying distances between one another of 0.1-2.0 centimeters.

8. A fixed bed reactor system, comprising:
a horizontal vessel comprising an elongated, fixed catalyst bed positioned inside the horizontal vessel laterally along the length of the horizontal vessel;
an inlet assembly connected to a central top portion of the horizontal vessel, the inlet assembly having an upper half portion and a lower half portion, the upper half portion comprising first, second and third inlets wherein the first inlet and the second inlet are inclined with respect to the vertical axis of the inlet assembly, the first, the second and the third inlets converging to form the lower half portion comprising a central arm; and
a feed distributor contained inside the central arm downstream of the first, the second and the third inlets and upstream of the fixed catalyst bed, the feed distributor comprising a deflector plate and a frustum cone, the deflector plate having a top end, a bottom end and a vertical span, the vertical span comprising a plurality of horizontal slits along the vertical span length, the frustum cone connected to the bottom end and having an angled, lateral surface comprising a plurality of perforations arranged in rows with triangular pitch.

9. The fixed bed reactor system of claim 8, wherein the horizontal slits are parallel to one another.

10. The fixed bed reactor system of claim 8, wherein the frustum cone further comprises a base edge that aligns with the central top portion of the horizontal vessel.

11. The fixed bed reactor system of claim 8, wherein the feed distributor has a height that is at least half of the height of the inlet assembly.

12. The fixed bed reactor system of claim 8, wherein the fixed catalyst bed comprises a catalyst selected from the group consisting of a chromia-alumina catalyst, a chromium-based catalyst, a silica-based catalyst, a zirconia-based catalyst, an alumina-based catalyst, a zeolite-based catalyst and a catalyst suitable for catalyzing dehydrogenation of hydrocarbons.

13. The fixed bed reactor system of claim 8, wherein the horizontal vessel further comprises one or more outlets for emission of reaction products.

14. The fixed bed reactor system of claim 8, wherein the horizontal vessel further comprises one or more distributor trays above the fixed catalyst bed and below the feed distributor.

15. The fixed bed reactor system of claim 8, wherein the horizontal slits have equal or varying thicknesses of 0.1-0.5 millimeters, wherein the horizontal slits have equal or varying distances between one another of 20-120 meters.

16. The fixed bed reactor system of claim 8, wherein the perforations have equal or varying diameters of 1.0-20.0 centimeters, wherein the perforations have equal or varying distances between one another of 0.25-2.0 centimeters.

17. The fixed bed reactor system of claim 8, wherein the triangular pitches have equal or varying lengths.

18. A method of producing an olefin by dehydrogenation of a corresponding alkane, comprising:
contacting the corresponding alkane with a fixed bed reactor system comprising a horizontal vessel comprising an elongated, fixed catalyst bed positioned inside the horizontal vessel laterally along the length of the horizontal vessel;
an inlet assembly connected to a central top portion of the horizontal vessel, the inlet assembly having an upper half portion and a lower half portion, the upper half portion comprising first, second and third inlets wherein the first inlet and the second inlet are inclined with respect to the vertical axis of the inlet assembly, the first, the second and the third inlets converging to form the lower half portion comprising a central arm; and
a feed distributor contained inside the central arm downstream of the first, the second and the third inlets and upstream of the fixed catalyst bed, the feed distributor comprising a deflector plate and a frustum cone, the deflector plate having a top end, a bottom end and a vertical span, the vertical span comprising a plurality of horizontal slits along the vertical span length, the frustum cone connected to the bottom end and having an angled, lateral surface comprising a plurality of perforations arranged in rows with triangular pitch;
wherein the alkane is contacted with the fixed catalyst bed at a temperature of 600-650° C.

19. The method of claim 18, wherein the one or more fluid streams comprise a hydrocarbon feed stream.

20. The method of claim 18, wherein the hydrocarbon feed stream is selected from a propane stream, an n-butane stream, an isobutane stream, an isopentane stream, or a combination comprising at least one of the foregoing.

* * * * *